UNITED STATES PATENT OFFICE.

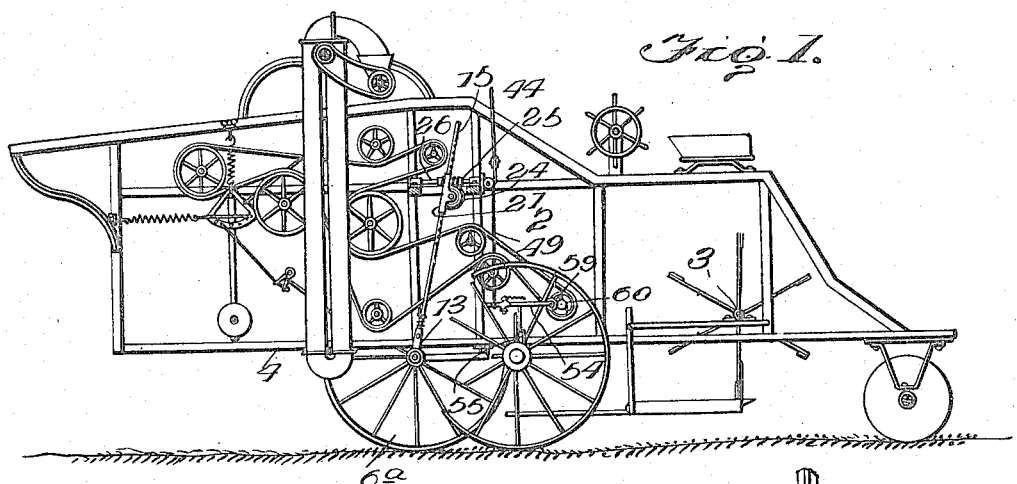
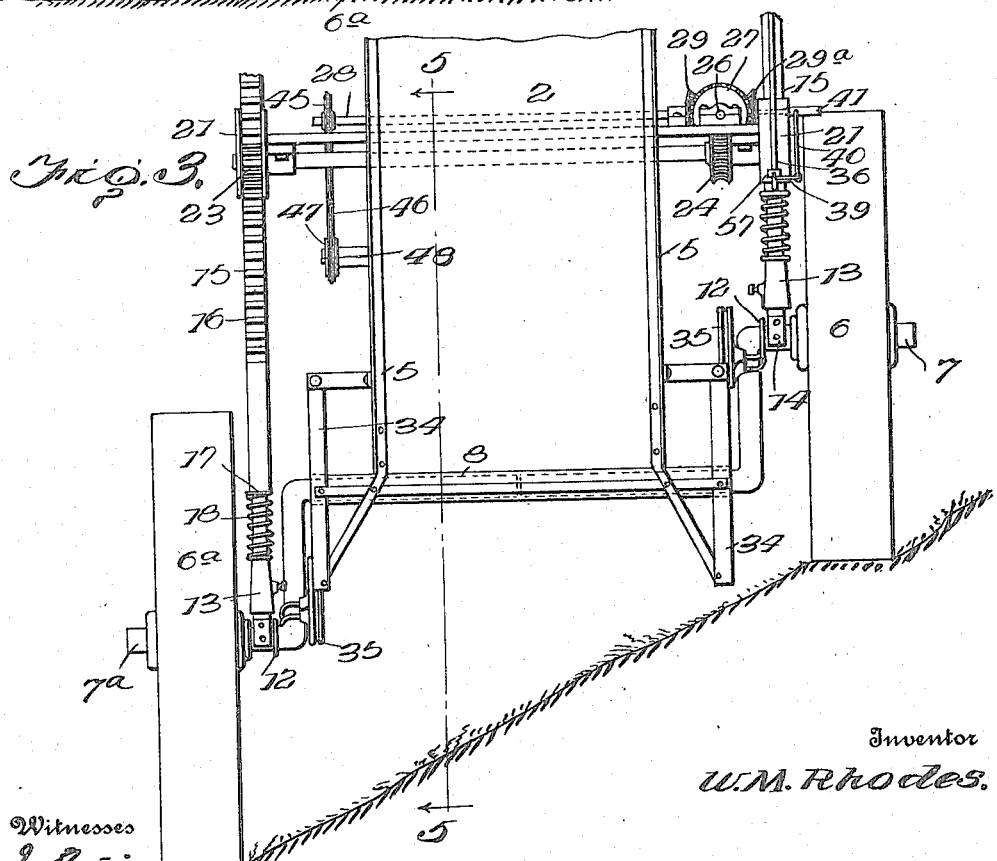

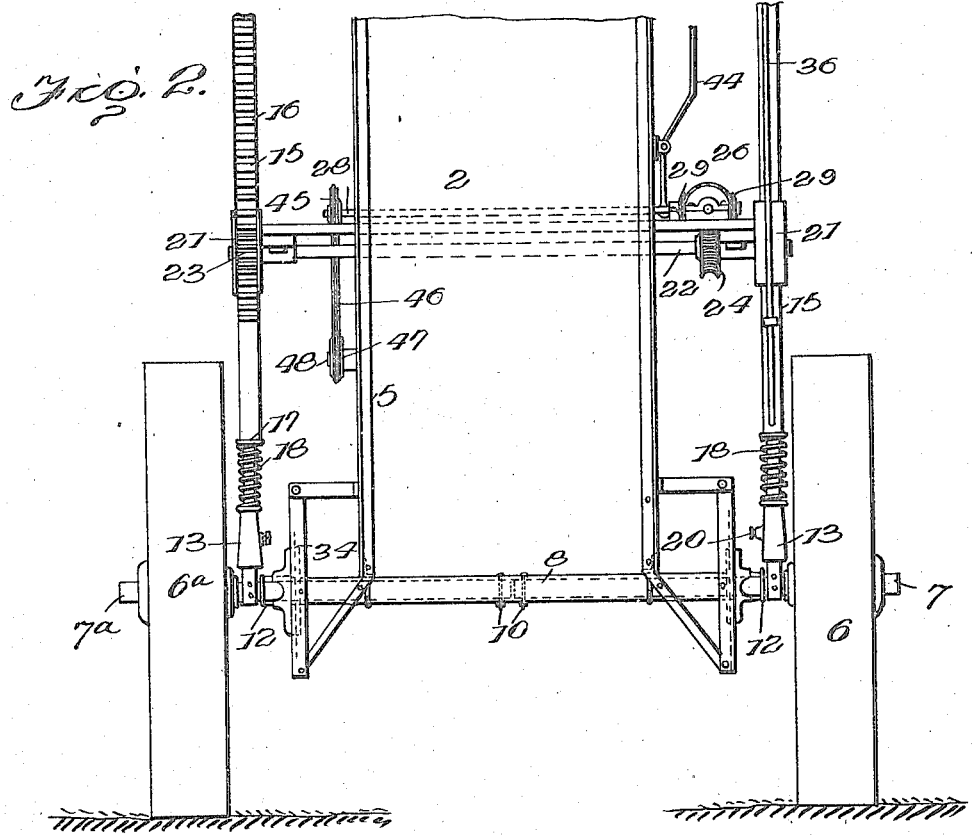

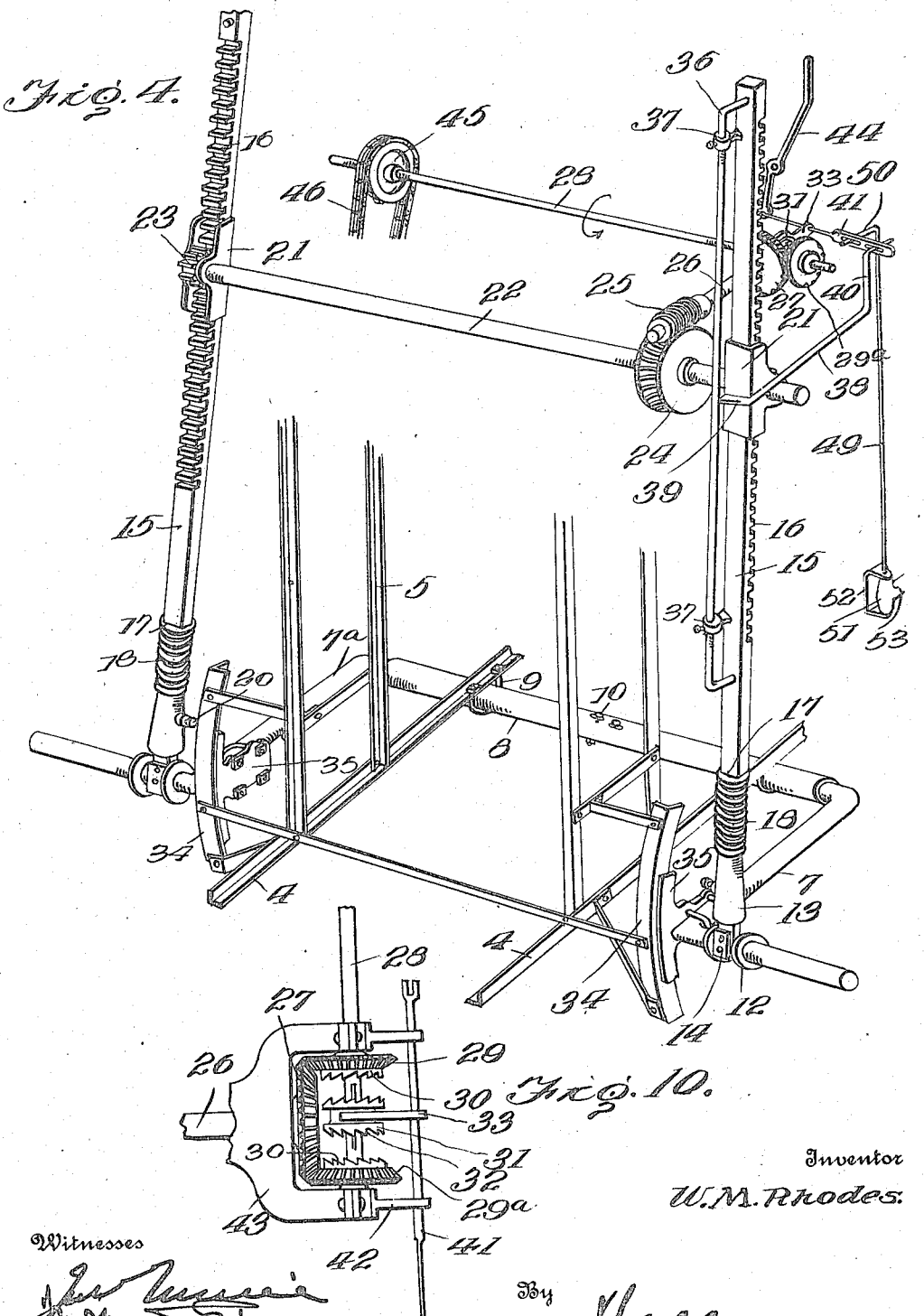

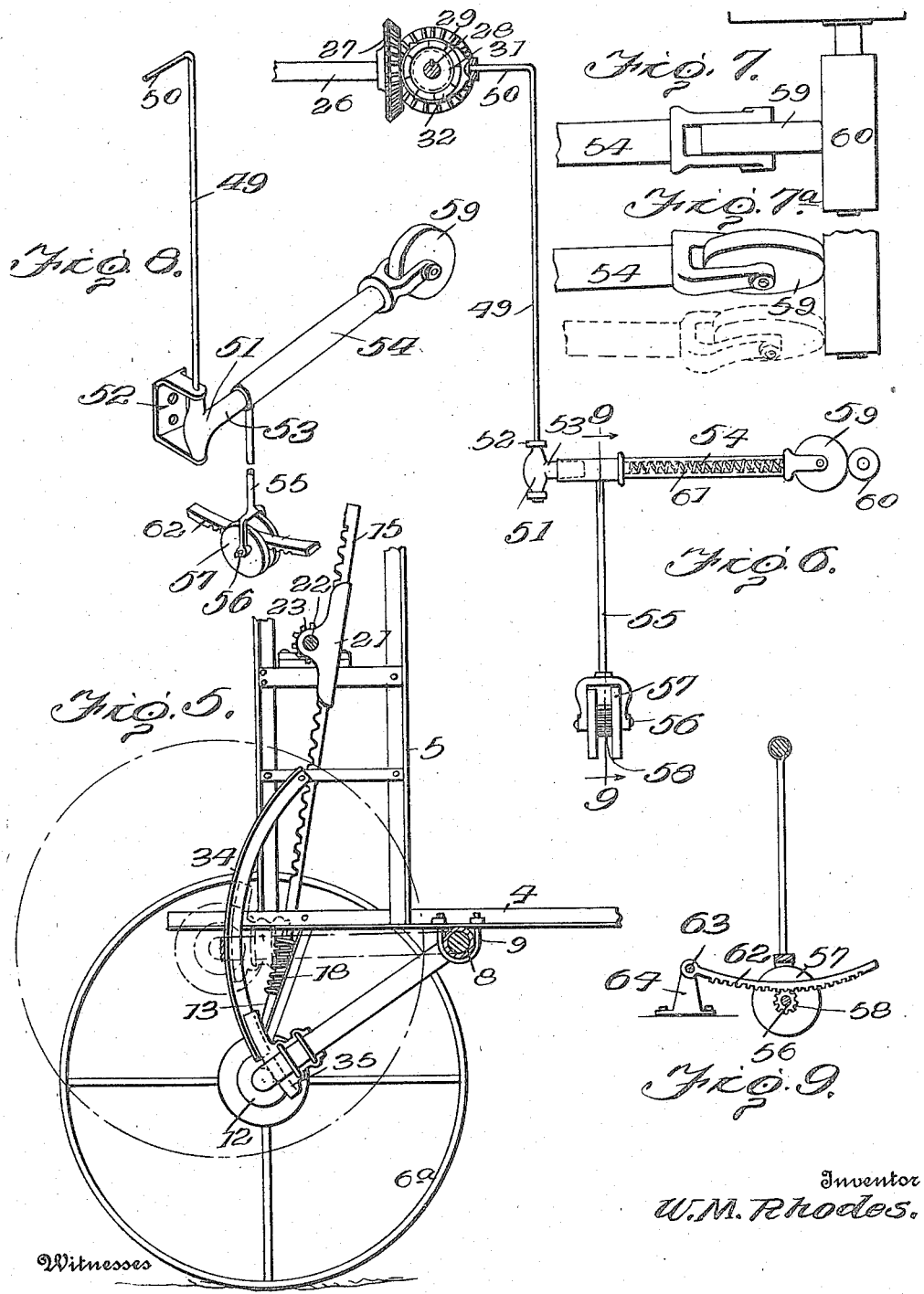

WILLIS M. RHODES, OF MOSCOW, IDAHO.

LEVELING MECHANISM FOR HARVESTERS.

1,135,618.  Specification of Letters Patent.  Patented Apr. 13, 1915.

Application filed November 15, 1913. Serial No. 801,247.

*To all whom it may concern:*

Be it known that I, WILLIS M. RHODES, citizen of the United States, residing at Moscow, in the county of Latah and State of Idaho, have invented certain new and useful Improvements in Leveling Mechanism for Harvesters, of which the following is a specification.

My invention relates to combined harvesters, that is harvesters which combine a reaping mechanism with threshing mechanism, and particularly to mechanism for leveling the body of the harvester in moving along side hills.

In combined harvesters which are intended to be used either on level ground or upon side hills, it is necessary to provide some means whereby the body of the harvester, which includes and supports the threshing mechanism, shall be supported on a level, as otherwise the mechanism of the harvester will not operate properly.

The primary object, therefore, of my invention is the provision of means whereby the body of the harvester may be adjusted to a horizontal plane without regard to the inclination of the side hill over which the harvester is operating, and a further object of the invention is the provision of automatic means whereby this leveling of the harvester body may be automatically controlled.

Another object of the invention is the provision of gravity actuated means for controlling the leveling of the harvester.

A further object of the invention is the provision of power actuated means whereby the supporting axle of the harvester may be rotated to bring the harvester to a level, and still another object is to provide means whereby this power actuated means may be either thrown out of or brought into engagement with the axles of the harvester to thereby cause the proper operation of the axles to level the machine.

Another feature of the invention is to improve the details of construction in mechanisms of this character so as to secure entire steadiness of movement for the axles.

A still further aim of the invention is the provision of gravity actuated means automatically acting to operatively connect the power mechanism to the axles to rotate the axles in one or the other direction to thereby bring the machine to a level automatically.

Other objects will appear in the course of the following description.

The invention is illustrated in the accompanying drawings, wherein:—

Figure 1 is a side elevation of a combined harvester showing the general disposition of the mechanism for leveling the body of the harvester; Fig. 2 is a rear elevation of the supporting frame for the body, the rear wheels and the means for actuating the cranked axles of these rear wheels. This view shows the axles and wheels in the position they occupy in traveling over level ground; Fig. 3 is a side elevation of the same character as Fig. 2, but showing the action of the axles when the machine is traveling along a side hill; Fig. 4 is a perspective detail view of the mechanism illustrated in Figs. 2 and 3; Fig. 5 is a fragmentary section on the line 5—5 of Fig. 3; Fig. 6 is a side elevation of the means for automatically controlling the connection of the power with the cranked axles; Fig. 7 is a detail view of the power roller 60 and actuating arm 54 and its wheel in neutral position; Fig. 7ª is a like view to Fig. 7, but showing in full lines the arm 54 and its roller or wheel moving toward the right, and in dotted lines a further movement of this arm and roller; Fig. 8 is a perspective view of a portion of the mechanism for controlling the application of power; Fig. 9 is a section on line 9—9 of Fig. 6 showing means for dampering the movement of the pendulum controlling the operation of the arm 54; Fig. 10 is a detail plan view of the clutch whereby the power applying shaft is operatively connected to the cranked axles; Fig. 11 is a fragmentary sectional view of one of the socketed supports and a portion of one of the rack-bars; and Fig. 12 is an enlarged section through the axle 8 on the line of one of the bolts 16.

Corresponding and like parts are referred to in the following description and indicated in all the views of the accompanying drawings by the same reference characters.

Referring particularly to Fig. 1, 2 designates the body of the combined harvester. Only the exterior casing is illustrated in this figure, and it will be understood that this casing incloses threshing mechanism of any desired type. 3 designates a header reel. The particular details of the threshing mechanism, the construction of the body and of the header have nothing whatever to do with this present invention, and hence require no description.

As illustrated, the body is supported by longitudinal sills 4 (see Figs. 2, 3 and 4) and by uprights 5. The traction wheels 6 and 6ª are loosely supported each upon a cranked axle, these axles being designated 7 and 7ª. Both of the axles are exactly the same in construction. The inner ends of the cranked axles are received in a sleeve 8, the inturned ends of these axles being sufficiently long to have a good bearing in this sleeve 8. The sleeve 8 is rigidly supported upon the frame in any suitable manner, and as illustrated in Fig. 4 is held to the sills 4 by U-bolts 9 so that the sleeve cannot turn but forms a bearing in which the cranked axles can turn. It will be seen that these cranked axles are independently movable with relation to each other. Each axle, as illustrated in Fig. 12, is cut-away for the passage of a bolt 10, the axle having a segmental opening 11 on diametrically opposite sides meeting through the center of the axle through which the bolt 10 passes, so that the bolt has a limited play within the axle. The bolt passes through the sleeve 8. While I have only illustrated one bolt for each axle holding it in place within the sleeve, it is to be understood that I may use more bolts if necessary. It will thus be seen that the axles each have a limited rotative movement within the sleeve.

The oppositely turned end of each cranked axle is formed with spaced collars 12, and loosely engaging the axle between these collars is a socketed member 13, illustrated in detail in Fig. 11. The lower end of the socket member is bifurcated to fit loosely over the axle and is held to the axle by means of a strap 14. I do not wish, however, to limit myself to this construction.

Mounted within each socket member 13 and extending vertically up therefrom is a rack-bar 15 having teeth 16 on one face. Surrounding the shank of each rack-bar 15 and bearing at its upper end against a shoulder 17 and at its lower end against the upper end of the socketed member 13 is a coiled spring 18. The rack-bar has a limited play within the socketed member to permit these springs to operate, this being accomplished by recessing one face of the lower end of the rack-bar as at 19 and engaging this recessed face by means of a set-screw 20 passing through the socketed member, as illustrated in Fig. 11. It is to be particularly noted that the toothed face of one of the rack-bars 15 is reversely placed to the teeth 16 on the other rack-bar. This is illustrated in Fig. 4.

Mounted upon both rack-bars are the guides 21. Each of these guides embraces its corresponding rack-bar and projects out beyond the toothed face thereof, and is formed to provide bearings for a shaft 22 which extends transversely across the machine. This shaft carries on its opposite ends the pinions 23 which engage with the teeth 16. Inasmuch as the teeth 16 of one rack-bar disposed on the opposite faces of the teeth 16 of the other rack-bar, it will be obvious that rotation of the shaft 22 in one direction will cause a depression of one rack-bar and a coincident elevation of the other rack-bar, so that the rack-bars, upon a rotation of the shaft 22, will travel in opposite directions. The shaft 22 is, of course, mounted in bearings in the frame of the machine so that it is stationary, but it will be noted that the rack-bars are not only held in engagement with the pinions 23 by means of the guides 21 but that the rack-bars are rotatably mounted upon the shaft 22 by means of these guides, thus permitting the lower ends of the rack-bars to move forward or rearward in an arc of a circle while the upward movement of the rack-bars or the downward movement thereof is permitted by the rack-bars passing through the guides 21.

The shaft 22 carries upon it the worm wheel 24 engaged by a worm 25 mounted upon a shaft 26 which is adapted to be operated by power actuating mechanism, as will be now stated. Mounted upon the shaft 26 is a beveled gear wheel 27 (see Fig. 10) and, extending at right angles to the shaft 26 and across the face of the wheel 27 is a power shaft 28 which is continuously driven. Loosely mounted upon the shaft 28 are the beveled gear wheels 29 and 29ª. These beveled gear wheels are disposed at opposite points of the diameter of the wheel 27 and engage therewith, and each of the wheels on its inner face is formed with teeth 30, the teeth 30 of one wheel being reversely disposed to the teeth 30 of the other wheel 29.

Shiftably mounted upon the shaft 28 and between the gear wheels 29 and 29ª is the clutch member 31 having oppositely disposed teeth 32, the teeth on one side being adapted to engage with the teeth of the adjacent wheel 29, while the teeth on the other side are adapted to engage with the teeth of the other wheel 29. The clutch member 31 is splined upon the shaft 28. When this member 31 is shifted into engagement with the wheel 29ª, it is obvious that it will cause the rotation of the shaft 26 in one direction, and when it is shifted into engagement with the wheel 29, it is obvious that it will rotate the shaft 26 in the opposite direction. When it is in its neutral position, and not in engagement with either of the wheels 29 or 29ª, no movement will be communicated to the shaft 26.

It will thus be seen that when it is desired to depress the traction wheel carried by the cranked axle 7ª and raise the traction wheel carried by the cranked axle 7 to cause the wheels to take the position illustrated in Fig. 3, for example, assuming that the shaft 28 is rotating in the direction of the arrow in Fig. 4, the clutch member 31 will be shifted by means of the shipper lever 33 into engagement with the gear wheel 29, and this will cause a rotation of the shaft 26 and shaft 22 which in turn will cause the raising of the rack-bar 15 engaged with the cranked axle 7 and a depression of the rack-bar connected with the cranked axle 7ª. When the cranked axle 7ª has been depressed to a sufficient degree and the cranked axle 7 has been raised to a sufficient degree, whatever that may be, the clutch member 31 is shifted to a neutral position, thus disconnecting the power shaft 28 from the worm shaft 26. The worm 25 will, of course, hold the worm wheel 24 from any rotation and this will hold the rack-bars in their shifted positions. The clutch member 31 may be shifted along the shaft 28 either manually or by automatically operating means, as will be later described.

In order to provide for guiding the free ends of the cranked axles, I provide arcuate guides 34 which are rigidly mounted upon the frame of the machine and which are preferably angular in form. These guides may have any angular extent desired, but I have found in practice that an angular extent of about 45° is all that is necessary to secure a proper adjustment of the traction wheels. Mounted upon the radially extending portions of the axles is a guiding member 35 which is slotted or otherwise formed to embrace one of the flanges of the corresponding arcuate guide 34, and this guiding member 35 has a sliding engagement with the arcuate guide. It will be obvious that this will support the radial portion of each axle at its free end in a definite plane and prevent any outward springing or deformation of the axles.

It is, of course, necessary to provide some means for preventing the rack-bars 15 from raising or lowering to such an extent that the pinions 23 will move out of engagement with the teeth 16. To this end, I provide on one of the rack-bars a parallel rod 36, carrying the adjustable collars 37 held in position by set-screws, and rotatably mount upon the frame of the machine in any suitable manner a shaft 38 having a crank arm 39 at one end and a crank arm 40 at the other end. The crank arm 39 projects in the path of movement of the collars 37. The crank arm 40 passes through the slot in a sliding shipper rod 41 which, as illustrated in Fig. 10, passes through guides 42 on the yoke 43 which supports the shaft 26 and the shaft 28, this rod 41 being operatively connected to the shipper arm 33 whereby the clutch member 31 is moved. To the other end of this rod 41 is connected the hand lever 44 or other means for manually operating the reversing gear illustrated in Fig. 10.

It will be seen now that upon an upward movement of the rack-bar 15 connected to the axle 7, the lower collar 37 will engage with the arm 39 on the shaft 38 and rotate the shaft 38. This will cause the arm 40 to move outward, shifting the arm 41 in a direction to carry the clutch member 31 out of engagement with the gear wheel 29 and into neutral position. If, on the contrary, the rack-bar 15 is depressed to a sufficient degree, the upper collar 37 will strike the arm 39, rotating the shaft 38 in a direction opposite to that first described, forcing the rod 41 inward and shifting the clutch member 31 to a neutral position. It will also be obvious that by operating the lever 44 manually, the operation of the shaft 26 and, therefore, of the rack-bars and cranked axles may be manually controlled. While I have illustrated the lever 44 as being disposed immediately in advance of one of the rack-bars, it will be understood that this lever or the rod 41 might be connected to any suitable transmission devices so that the rod 41 can be operated from a distance.

While I do not wish to be limited to any means for transmitting power to the shaft 28, I have illustrated this shaft as carrying a sprocket wheel 45 over which passes a sprocket chain 46 which extends over a sprocket wheel 47 mounted upon a shaft 48 which is driven in any suitable manner from the mechanism of the thresher.

While my mechanism is entirely adapted to be operated manually, I have provided means whereby the raising or lowering of the traction wheels may be accomplished automatically. To this end, I provide a vertical shaft 49 having a crank arm 50 at its upper end which engages in a slot in the controlling rod 41. The lower end of this shaft 49, as illustrated particularly well in Fig. 8, is mounted in a knuckle 51 supported in a bearing bracket 52 mounted in any suitable manner upon the frame of the machine. Slidably supported upon the outwardly projecting arm 53 of this knuckle is a tubular extension 54 which has telescopic engagement with the arm 53, and also has a rotation upon its longitudinal axis relative to the arm 53. Depending from this tubular member 54 is a pendulum 55 which is bifurcated at its lower end, and passing through the arms of the bifurcated extremity is a pin 56 upon which is mounted the spaced weight disks 57 and a connected toothed wheel 58. Mounted upon the outer extremity of the tubular member 54 is a friction wheel 59 which is adapted to bear against a frictional roller 60 mounted upon a shaft operatively connected to any suitable constantly rotating mechanism of the threshing machine, as illustrated in Fig. 1. Contained within the tubular member 54 is an expansion spring 61 which acts to urge the friction wheel 59 against the roller 60 so as to secure frictional engagement between the two.

The pendulum 55 swings in a plane at right angles to the length of the machine. When, therefore, the road or ground inclines so as to cause the machine to dip, the pendulum will swing relatively to the machine and will cause the tubular member 54 to rotate upon its longitudinal axis, thus inclining the wheel 59 with reference to the longitudinal axis of the roller 60. As this roller is constantly rotating, the frictional wheel 59 will proceed to travel longitudinally upon the roller 60 in one direction or the other, depending upon the direction of rotation of the tubular member 54. As a consequence, the arm formed by the portion 53 of the member 54 will commence to turn and this will turn the shaft 49 which, through its crank arm 50, will cause the shifting of the rod 41 and this will eventually shift the clutch member 31 into engagement with one or the other gears 29 or 29ª, thus causing the rotation of the shaft 26 in one direction or the other, and thus causing the depression of one of the rack-bars 15 and the elevation of the other rack-bar until the body of the machine has come to a level position, causing the wheel 59 to move back to its neutral position, and shifting the clutch member 31 to its neutral position.

In order to prevent the pendulum 55 from vibrating sufficiently to throw in or out the clutch member 31 at very slight dips or hollows in the ground which might tend to rock the machine, and thus vibrate the pendulum, I may provide dampering means engaging the pendulum. One form of this dampering means is illustrated in Fig. 9, wherein 62 designates an arcuate rack-bar pivotally supported at one end as at 63 and bearing upon the toothed wheel 58. The pivoted end of the member 62 is supported in a bracket 64 in turn supported in any suitable manner upon the frame of the machine. This arcuate bar 62 will resist minor movements of the pendulum so that the pendulum will move only in cases where the machine is inclined by reason of traveling along a hill-side or permanent inclination.

Attention is particularly called to the use of the springs 18. These springs are a very important feature of my invention, as without the springs the body of the machine would be jolted and rocked about by every slight irregularity in the ground so that the operators on the machine would have to either hold on to the frame work while the machine was working or would have to be strapped in place when traveling over rough ground. By the use of the springs 18, the jars and shocks to which the traction wheels are subjected are deadened or entirely eliminated before passing to the rack-bars 15. This not only very greatly increases the ease and comfort with which the machine may be operated, but it eliminates the strains to which the gearing engaged by these rack-bars would otherwise be subjected.

While I have illustrated details of my mechanism which I have found to be entirely effective in practice, I wish it understood that various changes might be made in the details of construction and arrangement of parts without departing from the spirit of my invention.

The operation of my invention will be obvious from what has gone before. While the machine is traveling over level ground, that is ground that is not inclined laterally with relation to the machine, the pendulum 55 will hang parallel to the side of the machine. When, however, inclined ground is reached and the machine commences to tilt laterally, the pendulum will tilt with the machine toward one side or the other, and as a consequence the wheel 59 will turn relative to the roller 60 and the arm 54 will be laterally shifted in one direction or the other, thus turning the shaft 49 in one direction or the other and sliding the clutch member 31 into engagement either with the gear wheel 29 or 29ª. This will cause the rotation of the worm shaft, and this, through the shaft 22, will cause one of the rack-bars to be depressed while the other raises. When the machine comes again to a vertical position as by the depression of one traction wheel and the raising of the other in the position shown in Fig. 3, the clutch member 31 will be shifted to a neutral position and the rotation of the shaft 26 will be stopped. By using a worm gear to transmit the power of shaft 26 to shaft 22, I lock the rack-bars in their adjusted positions, thus preventing the rack-bars from shifting after they have been adjusted until shifted by the operation of the mechanism.

As before stated, I do not wish to limit myself to the use of automatic means for accomplishing the actuation of the rack-bars, as the operation of engagement of the rack-bars with the shaft 28 and the reverse movement of the rack-bars may be accomplished entirely by hand under the control of the driver.

By providing a constantly rotating shaft 28 operatively connected to the operating mechanism of the thresher, I provide means for securing a relatively rapid actuation of the cranked axles, and I secure greater power for the actuation of the cranked axles than would be possible were the mechanism operated by hand.

Having thus described the invention what is claimed as new is:—

1. In mechanism of the character described, the combination with a harvester body, of opposed independently movable cranked axles, traction wheels thereon, vertically disposed rack bars pivotally connected at their lower ends to the free ends of the cranked axles, an actuating shaft having pinions thereon engaging said rack bars and disposed above the cranked axles, clips, through which the rack bars slide, pivotally connected to said shaft, a worm wheel on the shaft, and a driving worm engaging said worm wheel.

2. In mechanism of the character described, the combination with a harvester body, of opposed independently movable cranked axles, traction wheels thereon, vertically disposed rack bars pivotally connected at their lower ends to the free ends of the cranked axles, an actuating shaft having pinions thereon engaging said rack bars and disposed above the cranked axles, clips, through which the rack bars slide, pivotally connected to said shaft, a worm wheel on the shaft, a driving worm engaging said worm wheel, means for driving said driving worm, and means for disconnecting the driving worm from the driving means when the rack bars have been shifted to the limit of their movement in one or the other direction.

3. In mechanism of the character described, the combination with a harvester body, of opposed independently movable crank axles, traction wheels carried upon the crank arms thereof, vertically disposed rack bars extending upward from the arms of the cranked axles and pivotally connected to said arms, said rack bars having their racks disposed upon opposite sides relatively to each other, an actuating shaft for both of said rack bars having pinions thereon engaging said racks, a worm wheel on the shaft, a driving worm engaging the worm wheel, a driving shaft, oppositely disposed driving gears adapted to operatively engage said worm shaft, said driving gears being loose upon the driving shaft, clutch mechanism adapted to engage either of said driving gears with the driving shaft to thereby rotate the worm shaft in one or the other direction, means for shifting said clutch, and means actuated upon a movement of the rack bars to their full extent in either direction for shifting said clutch to a median position.

4. The combination with a harvester body, of a tubular member attached rigidly to the harvester body and extending transversely thereof and formed with transverse openings, cranked axles, each having one end thereof inserted in said tubular member, formed with transverse openings which flare transversely in opposition from a central point, the openings of the tubular member registering with the openings of the end portions of the cranked axles inserted in the tubular member, and fastenings passing through the registering openings of the tubular member and the end portions of the cranked axles to prevent longitudinal movement of the cranked axles but permit of a limited rotary movement thereof, traction wheels carried by the axles, and means for rotatably shifting the axles to raise or lower the traction wheels.

5. The combination with a harvester body, of opposed independent cranked axles, traction wheels thereon, rack bars operatively connected each to one of the cranked axles, said bars each being made in two sections, and compression springs disposed between the sections, and means for simultaneously shifting the rack bars in opposite directions to raise or lower said traction wheels.

6. The combination with a harvester body, of opposed independent cranked axles, traction wheels mounted thereon, a socket operatively connected to each cranked axle, a rack bar having sliding engagement in each socket, a compression spring surrounding the rack bar and resisting the inward movement of the rack bar into the socket, and means for simultaneously shifting the rack bars in relatively opposite directions.

7. The combination with a harvester body, of opposed independent cranked axles, traction wheels thereon, a connection of rigid material between each cranked axle and the harvester body and having a longitudinally yieldable portion in its length for yieldably supporting the harvester body, and means adjustably connecting the harvester body with the said connections.

8. The combination with a harvester body, of opposed independent cranked axles, traction wheels thereon, rack bars operatively connected each to one of the cranked axles, means for yieldably and resiliently connecting the rack bars to said cranked axles, and means for simultaneously shifting said rack bars in reverse directions to raise or lower the traction wheels.

9. The combination with a harvester body, of opposed independent cranked axles, traction wheels thereon, power actuated means operatively engaging with said axles to shift them simultaneously in reverse directions, gravity actuated means for automatically shifting the power actuated means into operative engagement with said axles, and means for dampening the movement of said gravity actuated means.

10. The combination with a harvester body, of opposed independent cranked axles, traction wheels thereon, power actuated means operatively engaging with said axles to shift them simultaneously in reverse directions, and a pendulum operatively connected to the bar actuated means and acting to automatically shift the power actuated means into operative engagement with said axles and thus automatically controlling the direction of movement of said axles.

11. The combination with a harvester body, of opposed independent cranked axles, traction wheels thereon, means for raising or lowering the cranked axles, arcuate guides arranged in conjunction with the swinging ends of the radially extending portion of each cranked axle, said guides being curved concentrically to the center of rotation of said axles, and slides carried on the swinging end of the radially extending portion of each cranked axle and each embracing and sliding upon one of said guides.

12. The combination with a harvester body, of opposed independent cranked axles, traction wheels thereon, vertically disposed rack bars mounted upon the free ends of the axles, the teeth of one rack bar being oppositely disposed to the teeth of the other rack bar, a transverse shaft, pinions thereon engaging the rack bars, a driving shaft, operative connections between the driving shaft and said first-named shaft, means for throwing the driving shaft out of engagement with the first-named shaft, and means for causing the actuation of said last named means when one of said rack bars has reached the limit of its movement in one or the other direction.

13. The combination with a harvester body, of opposed independent cranked axles, traction wheels thereon, vertically disposed rack bars, operatively connected to the free ends of the axles, the teeth on one rack bar being oppositely disposed to the teeth on the other rack bar, a transverse shaft, pinions on the transverse shaft, engaging said rack bars, means for supporting the shaft in pivotal engagement with the rack bars but permitting the rack bars to shift past the shaft, means for rotating said shaft in either direction and including a power shaft and a reversing gear, a rod carried by one of said rack bars and extending parallel thereto, stops mounted on said rod, and means disposed in the path of movement of said stops and adapted to be engaged thereby, said means acting to operatively shift said reversing gear upon engagement of said means with one or the other stop to thereby disconnect the power shaft from the rack bar operating mechanism.

14. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft connected to the driven shaft, a bevel gear thereon engaging with said first-named bevel gear wheels, a clutch member slidably mounted on the driving shaft between said bevel gear wheels and engageable with one or the other thereof, and a pendulum pivoted for movement transverse to the planes of the traction wheels, and operatively connected to said clutch member to shift it from a neutral position into engagement with either one or the other of the loose bevel wheels.

15. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft connected to the driven shaft, a bevel gear thereon engaging with said first-named bevel gear wheels, a clutch member slidably mounted on the driving shaft between said bevel gear wheels and engageable with one or the other thereof, and means for automatically shifting the clutch member from a neutral position into engagement with one or the other of said bevel wheels, said means including a pivoted arm, a friction wheel thereon, a constantly rotating friction roller with which the friction wheel engages, and gravity actuated means for turning said roller in one direction or the other to cause said wheel to travel along said friction roller from a neutral position toward one or the other of the friction rollers.

16. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft operatively connected to the driven shaft, a bevel gear thereon engaging said first-named bevel gear wheels, a clutch member slidably mounted on the driving shaft between said bevel gear wheels and engageable with one or the other thereof, and means for automatically shifting the clutch member from a neutral position into engagement with one or the other of said bevel wheels, said means including a pivoted arm, a constantly moving power operated member, and gravity actuated means for engaging the arm with said power operated member to cause the arm to shift along said power actuated member in one direction or the other depending upon the inclination of the gravity actuated means relative to the machine.

17. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft operatively connected to the driven shaft, a bevel gear thereon engaging said first-named bevel gear wheels, a clutch member slidably mounted on the driving shaft between said bevel gear wheels and engageable with one or the other thereof, and means for automatically shifting the clutch member from a neutral position into engagement with one or the other of said bevel wheels, said means including a constantly operated power actuated member, a clutch shifting mechanism engaged by said power actuated means for controlling the movement of the clutch shifted member by the power actuated member.

18. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft operatively connected to the driven shaft, a bevel gear thereon engaging said first-named bevel gear wheels, a clutch member slidably mounted on the driving shaft between said bevel gear wheels and engageable with one or the other thereof, and means for automatically shifting the clutch member from a neutral position into engagement with one or the other of said bevel wheels, a vertical shaft having a crank arm at its upper end operatively connected to the clutch member, an arm projecting laterally from said shaft, a tubular sleeve mounted on the arm for telescopic movement and rotational movement, a pendulum depending from said sleeve, a friction wheel mounted on the end of the sleeve, and a constantly operated power driven friction roller with which said wheel engages.

19. The combination with a harvester body, opposed independent cranked axles, traction wheels thereon, of vertically disposed rack bars operatively connected to the free ends of the axles, the teeth of one rack bar being oppositely disposed to the teeth of the other rack bar, a transverse driven shaft, pinions thereon engaging said rack bars, a constantly operated driving shaft, oppositely disposed bevel wheels loosely mounted upon said driving shaft, an intermediate shaft operatively connected to the driven shaft, a bevel gear thereon engaging said first-named bevel gear wheels, a clutch member slidably mounted on the driving shaft between said bevel gear wheels and engageable with one or the other thereof, and means for automatically shifting the clutch member from a neutral position into engagement with one or the other of said bevel wheels, a vertical shaft having a crank arm at its upper end operatively connected to the clutch member, and arm projecting laterally from said shaft, a tubular sleeve mounted on the arm for telescopic movement and rotational movement, a pendulum depending from said sleeve, a friction wheel mounted on the end of the sleeve, a constantly operated power driven friction roller with which said wheel engages, means for urging said wheel against said roller, and means for retarding the lateral movement of the pendulum.

In testimony whereof I affix my signature in presence of two witnesses.

WILLIS M. RHODES. [L. S.]

Witnesses:
J. D. YOAKLEY,
FREDRIC B. WRIGHT.